United States Patent [19]

Peterson

[11] 4,331,003
[45] May 25, 1982

[54] FLEXIBLE COUPLING

[75] Inventor: Robert R. Peterson, Hudson, Mass.

[73] Assignee: Barry Wright Corporation, Newton Lower Falls, Mass.

[21] Appl. No.: 61,062

[22] Filed: Jul. 26, 1979

[51] Int. Cl.³ .............................................. F16D 3/22
[52] U.S. Cl. ..................................... 464/76; 464/904; 464/149; 464/150
[58] Field of Search ....................... 64/21, 9 R, 14, 16, 64/27 NM, 31, 7, 11 R

[56] References Cited

U.S. PATENT DOCUMENTS

| 1,261,161 | 4/1918 | Peters | 64/9 R |
| 1,921,737 | 8/1933 | Fenaille | 64/16 |
| 2,075,481 | 3/1937 | Thomas | 64/31 |
| 2,609,673 | 9/1952 | Butterfield | 64/21 |
| 2,616,273 | 11/1952 | Pringle | 64/27 NM |
| 3,540,233 | 11/1970 | Pearson | 64/14 |
| 4,208,889 | 6/1980 | Peterson | 64/27 NM |

Primary Examiner—Charles J. Myhre
Assistant Examiner—Magdalen Moy
Attorney, Agent, or Firm—Milton E. Gilbert; Gary E. Ross

[57] ABSTRACT

A coupling of the "Tracta" joint type comprises a driving member rotatable about a first axis, a driven member rotatable about a second axis, and two intermediate members for operatively coupling the driving member to the driven member. The improvement comprises elastomeric bearing means disposed between and engaging each set of mutually opposing bearing surfaces of the driving, driven and intermediate members under compression when torque is applied to the driving member about the first axis.

4 Claims, 3 Drawing Figures

FLEXIBLE COUPLING

The present invention relates generally to couplings and more particularly to flexible couplings for transmitting torque between a driving member and a driven member.

One type of flexible coupling often referred to as the "Tracta" joint coupling, is useful in joining rotatable driving and driven members having respective axes of rotation which are typically at an angle to one another. Generally, the Tracta joint coupling includes two intermediate floating members coupled to one another for coupling in an operative manner a driving shaft to a driven shaft. Typically, each shaft is provided with an end fork yoke adapted to be received by a groove provided in a respective one of the intermediate members, and one of the intermediate members further includes a tongue adapted to be received by a second groove in the other intermediate member. The yokes are typically maintained in the respective grooves of the intermediate members and the tongue of the one intermediate member is maintained in the second groove of the other intermediate member by mounting the end yokes of the shafts and the intermediate members with respect to one another in an assembled relation within an outer sealed casing or housing.

The Tracta joint coupling manufactured as early as the 1940's, has particular utility in front wheel driven trains of motor vehicles. The general structure of the coupling provides a rugged construction, and is capable of accommodating large torque loads over a large range of operating angles ("operating angle" being defined as the supplementary angle of the angle between the rotation axes of the driving and driven shaft members). For example, one commercially available prior art Tracta joint coupling which has been manufactured by New Process Gear of Syracuse, New York is described as being operable at any operating angle between 20° and 45° and having torque capacities from 1000 to 150,000 inch pounds.

This prior art Tracta joint coupling however, is relatively heavy due to the sealed enclosure housing (1) supporting and mechanically holding the interfitting driving, driven and intermediate members in an assembled relationship so that the parts are forced into their kinetic track, and (2) containing the lubricant for the bearing surfaces of the interfitting parts. The lubricant must always be provided between the oppositely opposed bearing surfaces in order to prevent excessive wear and stress. Even when lubricated, energy is lost as a result of a heat loss due to friction between the bearing surfaces. For example, typical coefficients of friction between lubricated metal-to-metal bearing surfaces varies from between about 0.08 to about 0.30 (an average of about 0.19). Such relatively high coefficients of friction are directly proportional to energy losses. Further, due to the nature of the bearing surfaces, a significant amount of backlash will typically be provided when the prior art coupling is reverse loaded.

It is a general object of the present invention to provide an improved coupling which overcomes or substantially reduces the problems of the prior art coupling.

More specifically, objects of the present invention are to provide an improved universal joint coupling of the Tracta type which (1) requires no lubrication, (2) reduces or substantially eliminates heat loss at the bearing surfaces thereby conserving energy, (3) is provided with improved bearing surfaces capable of carrying greater maximum compressional stress levels while accommodating relative motion, (4) is provided with improved bearing surfaces capable of providing restoring spring forces resulting from angular and/or axial misalignment with respect to the neutral position (the latter position being defined by the position of driving and driven members about their proper axial positions at the operative angle), (5) is substantially lighter due to the elimination of the enclosure housing, and (6) has approximately zero backlash from reverse loadings.

These and other objects of the present invention are achieved by an improved coupling of the type comprising a driving member rotatable about a first axis; a driven member rotatable about a second axis; and a pair of intermediate members for operatively coupling the driving and driven members together. The improvement comprises elastomeric bearing means disposed between and engaging each set of mutually opposing bearing surfaces of the driving, driven and intermediate members under compression when torque is applied to the driving member about the first axis.

Other features and many attendant advantages of the invention are disclosed in or rendered obvious by the following detailed description taken in connection with the accompanying drawing wherein.

Figure 1:
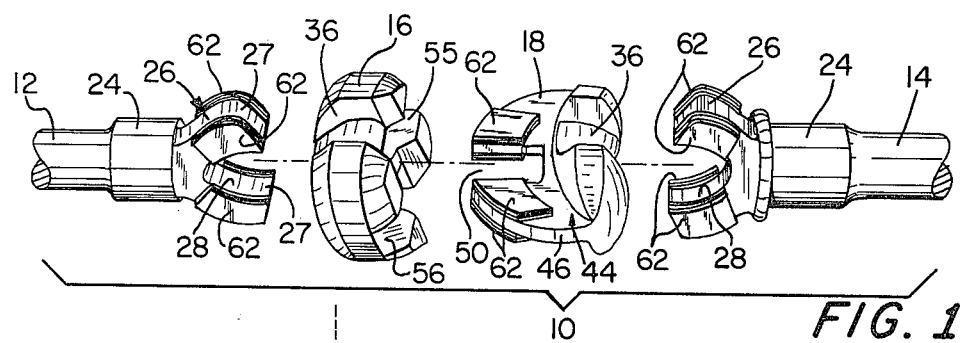
FIG. 1 is an exploded perspective view of the preferred embodiment of the present invention.

Referring to the drawing, the preferred embodiment of the coupling is generally shown at 10. The preferred coupling comprises substantially identical driving and driven members, in the form of shafts 12 and 14, and two intermediate members 16 and 18.

Figure 2:
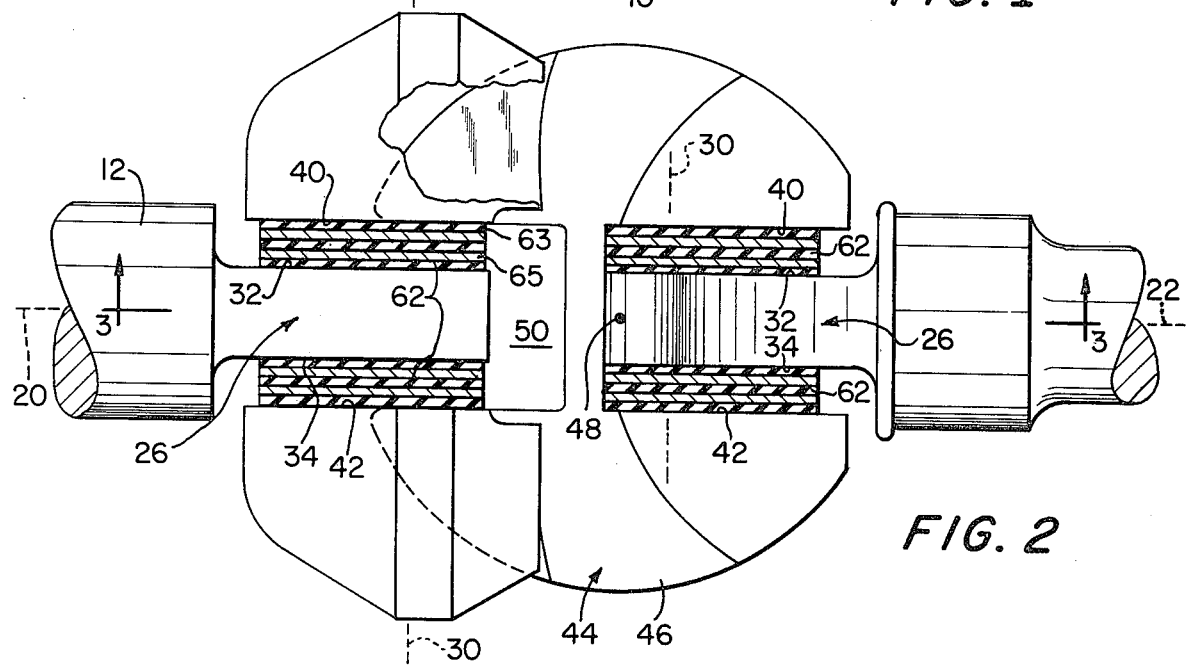
FIG. 2 is a top, axial view of the preferred embodiment, partially shown in section.
Figure 3:
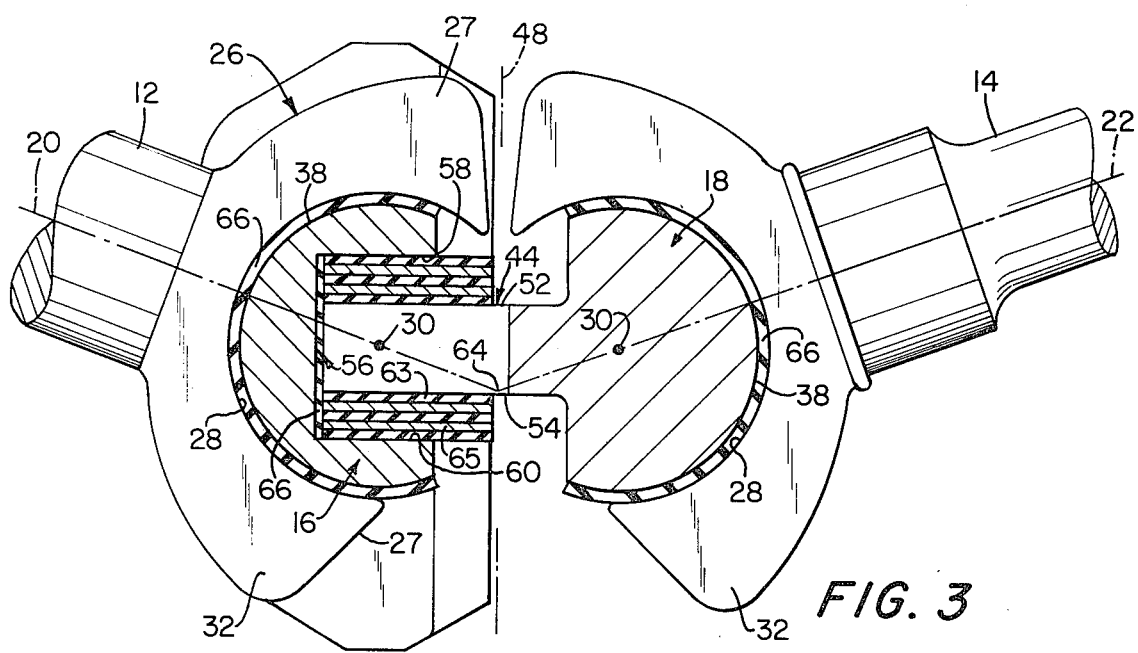
FIG. 3 is a side axial view of the preferred embodiment partially shown in section.

Shafts 12 and 14 are each mounted by suitable means, such as rotational bearings (not shown), so as to be rotatable about the respective rotation axes 20 and 22, disposed at a predetermined operating angle as shown. Each shaft may be provided with a suitable thrust or radial bearing surface 24 suitable for engaging such bearings. An end of each of the shafts 12 and 14 is provided with a fork yoke 26 for respectively engaging and coupling with the intermediate members 16 and 18. Each yoke 26 includes a pair of bosses 27, each formed so as to provide an arcuate, substantially cylindrically-shaped surface 28 therebetween mounted with respect to the corresponding intermediate members 16 and 18 so as to have an axially central pivotal axis 30 (shown in FIGS. 2 and 3). Bosses 27 are also formed so as to provide parallel, substantially flat bearing surfaces 32 and 34 on opposite sides of each yoke, each surface 32 and 34 lying in a plane substantially perpendicular to the corresponding pivotal axis 30. When coupling 10 is assembled, the two axes 30 are disposed parallel to one another and the surfaces 32 of shafts 12 and 14 are coplanar and surfaces 34 of shafts 12 and 14 are coplanar.

The preferred intermediate members are formed so that one functions as a female or joint groove coupling member (shown at 16) while the other functions as a male or joint tongue and groove coupling member (shown at 18). Each intermediate member 16 and 18 comprises a groove 36 adapted to receive the yoke 26 of the respective shaft 12 and 14. Each groove 36 defines an arcuate, substantially cylindrically-shaped surface 38 adapted to approximately mate with the cylindrical surface 28 of the corresponding yoke 26 so as to allow at least limited relative pivotal movement between the intermediate member and the respective yoke 26 about the corresponding axis 30 as will be better understood from the description hereinafter. Further, the opposite side wall surfaces 40 and 42 of each groove 36 are generally flat and parallel to one another, and oppose respectively in a mutually confronting relation the surfaces 32 and 34 of the corresponding yoke 26 so as to form bearing surfaces which carry compressive loads when a torque load is applied to the driving shaft about its respective rotation axis.

The intermediate members 16 and 18 additionally include a tongue and groove arrangement for operatively connecting the two members together. Specifically, the male intermediate member 18 includes a tongue 44 having a peripheral substantially-cylindrical outer edge 46 which defines with the intermediate member 16 a center pivotal axis 48. The tongue 44 is slotted at 50 so as to form two tongue sections and further includes opposite substantially flat surfaces 52 and 54 on the tongue sections. Surfaces 52 and 54 extend parallel to one another and lie in planes which are perpendicular to the planes defined by the surfaces 40 and 42 of the slot 36 of member 18. The female intermediate member 16 includes a second groove 55 sized to receive the tongue 44 of member 18. Specifically, second groove 55 is defined by an arcuate, substantially cylindrical wall 56 adapted to substantially mate with the outer edge 46 of the tongue 44 of the intermediate member 18 so as to permit at least limited relative pivotal motion about axis 48 due to shear motion about that axis as will be more evident hereinafter. The opposite side wall surfaces 58 and 60 are generally flat and parallel to one another, and oppose in a mutually confronting relation the respective flat side surfaces 52 and 54 of the tongue 44 so as to form bearing surfaces which carry compressive loads when a torque load is applied to the driving shaft about its rotation axis. The side walls 58 and 60 both lie in planes substantially perpendicular to the planes defined by the bearing surfaces 40 and 42 of the slot 36 of the female intermediate member 16.

To the extent described, the foregoing structure is similar to structure found in a prior art Tracta joint coupling, i.e. the "Model 90" Tracta joint coupling which has been manufactured by New Process Gear of Syracuse, New York as in-system ordanace component for the M-37 ¾ ton Cargo Vehicle. In addition to the foregoing structure as described the entire coupling is mounted in and supported by a suitable sealed enclosure or casing (not shown) which is typically filled with a lubricant so as to maintain the opposing bearing surfaces which carry a compression load and frictionally engage and move with respect to one another in response to shear when a torque load is applied to the driving shaft about its rotation axis.

This prior art structure however, has several disadvantages. First, the bearing surfaces must be constantly lubricated when in use. Should the housing develope a leak the bearing surfaces would heat due to the lack of lubrication resulting in energy losses and premature wear of the coupling. The housing adds considerable weight to the coupling assembly. Should one or both shafts becomes angularly or axially misaligned from the neutral position uneven loads on the bearing surfaces can result, causing further premature wear of the coupling. Even when lubricated the metal-to-metal mutually confronting bearing surfaces are limited in the maximum compressional stress levels. Finally, due to metal-to-metal bearing surfaces a certain amount of backlash will result from reverse loading. These and other disadvantages which will be evident to those skilled in the art are reduced or overcome by modifying the foregoing structure in accordance with the present invention.

More particularly, each yoke 26 of shafts 12 and 14 and the corresponding groove 36 of intermediate members 16 and 18, and the tongue 44 and corresponding groove 55 are sized so that a space is provided between the mutually confronting bearing surfaces, i.e., those bearing surfaces which carry compression loads in response to torque applied to the driving shaft about its rotation axis. In accordance with the present invention coupling 10 further comprises elastomeric bearing means disposed within each of these spaces between and engaging the mutually confronting surfaces associated with each space. The elastomeric bearing means are preferably "high compression laminate" bearing units 62. Thus, a unit 62 is disposed between and engages each of the mutually confronting bearing surfaces 32 and 40, 34 and 42, 52 and 58, and 54 and 60 of the members 12, 14, 16 and 18. As shown, two units 62 are preferably provided between each pair of mutually confronting surfaces one for each surface of the extending bosses 27 of the yoke and each flat surface of the tongue sections of the tongue 44. It will be appreciated however that a single unit can be utilized between each pair of mutually confronting surfaces wherein the entire side surfaces of yokes 26 and tongue 44 are secured to the unit. Each unit generally includes alternate layers 63 and 65, respectively of a resilient, elastomeric material, such as a rubber or certain plastics, and a nonextensible material, such as a metal, with the outermost and innermost layers preferably being of resilient material. The layers are bonded together, for example, with a suitable bonding cement with the innermost and outermost layers respectively engaging (e.g., by bonding or compressing the unit and force fitting) the adjacent mutually confronting bearing surfaces. By utilizing such elastomeric bearing units, undesirable vibration can be at least partially dampened and noise, as well as vibration-induced wear and stress reduced. Further, energy is conserved since little or no heat is generated between the bearing surfaces. Further, due to the resiliency of the elastomeric material, these bearing units provide counteracting restoring forces to relative shearing motion between the two mutually confronting surfaces which is provided when axial or angular misalignment is applied to the driving shaft. The size, thickness and number of layers of each unit 62 and the durometer of the elastomeric material depends upon the particular compression stress levels to be expected and the amount of coupling misalignment (i.e., either angular or axial misalignment of either shaft 12 or 14 from its neutral or operative position). In accordance with the present invention, oppositely disposed units 62 (i.e., the units between surface 32 of yoke 26 of shaft 12 and surfaces 40 of intermediate member 16 oppose the units between surfaces 34 of yoke 26 of shaft 12 and surface 42 of member 16, the units between surface 52 of tongue 44 and surface 58 of intermediate member 16 opposite the units between surface 54 of tongue 44 and surface 60 of member 16, and the units between surface 32 of yoke 26 of shaft 14 and surface 40 of intermediate member 18 oppose the units between surface 34 of yoke 26 of shaft 14 and surface 42 of member 18) are provided with approximately the same torsional spring rates (i.e., the spring rate determined as a function of compression loads on each of the units). Preferably, all of the bearing units 62 are provided with substantially identical torsional spring rates so that a substantailly equal compressive load in response to torque applied about one of the rotation axis of shafts 12 and 14, is carried by all the bearing units so that the intermediate members 16 and 18 "float", i.e., the surfaces 32, 40, 34, 42, 52, 58, 54 and 60 will move in shear (i.e., parallel to the plane of the surface) in response to axial misalignment or displacement of the rotation axes 16 and 18.

Further, the angular spring rate (i.e. a spring rate as a function of shearing forces i.e., forces applied parallel to the plane of the surface) of opposing bearing units 62 are substantially equal. Preferably all of the bearing units are made with substantially the same torsional and angular spring rates. This feature allows the coupling to function as a constant velocity coupling so that when torque is applied to one shaft 12 or 14 at a fixed velocity the torque is transmitted through the coupling causing the other shaft to rotate at this velocity regardless of whether axes 12 and 14 are aligned or angularly misaligned. In particular, as a constant velocity coupling, the shafts 12, 14 and the intermediate member are all mounted in the neutral position so that the axes 20, 22 and 48 all intersect at a single point 64 with axis 48 bisecting the angle formed by axes 20 and 22. Axis 48 will remain the bisector of the angle formed by axes 20 and 22 regardless of whether one or both of the shafts 12 and 14 become angularly misaligned from their neutral position.

In order to maintain the shaft members 12 and 14 about the respective axes 30 and the intermediate members 16 and 18 about center axis 48, elastomeric layers 66 may be disposed between and secured, by bonding or other suitable means, to each of the opposing cylindrically-shaped surfaces provided by each of the cylindrical surfaces 28 of yokes 26 and corresponding surfaces 38 of the intermediate members, and the opposing surfaces provided by the edge 46 of tongue 44 and the cylindrical wall 56 of intermediate member 16.

The invention as herein described has many advantages, over the prior art coupling. For one, by using elastomeric high compression laminated bearings the compressive loads which can be carried by these bearings can be increased. For example, the compressive load carried by the bearing units 62 can be increased as much as four fold when compared to the loads carried by the metal-to-metal bearing surfaces of the prior art. The bearing surfaces need not be lubricated, mechanical wear will be substantially eliminated and energy conserved. Energy losses, due to hysteresis effects in the elastomer between the bearing surfaces are typically well below that of the lubricated metal-to-metal bearing surfaces provided by the prior art. The loss factor (an indication of damping or energy dissipation) for the elastomer of the laminated bearings is about 0.04 well below that of the metal-to-metal bearing surfaces of the prior art. Due to the elastomeric nature of the bearings, undesirable vibration can be at least partially dampened and noise, as well as vibration induced wear and stress can be reduced. The elastomeric material provides restoring forces from misalignment and is capable of accommodating angular and axial misalignment as shearing motion resulting from misalignment. Further, by making the bearing units 62 so that they have substantially equal angular spring rates, a constant velocity coupling can be provided. The coupling 10 requires no lubrication or containment due to the nature of elastomerics and also does not require the enclosure housing normally employed in the prior art thereby reducing the overall weight of the coupling. Finally, the elastomeric units enable the coupling 10 to have substantially zero backlash from reverse loadings.

Since certain changes may be made in the above apparatus without departing from the scope of the invention herein involved, it is intended that all matter contained in the above description or shown in the accompanying drawings shall be interpreted in an illustrative and not in a limiting sense.

What is claimed is:

1. In a flexible coupling of the type comprising a driving member rotatable about a first axis, a driven member rotatable about a second axis; and a pair of intermediate members for coupling said driving member to said driven member; said driving member and said driven member each including means for defining a first pair of spaced-apart parallel, flat bearing surfaces; said intermediate members including means for operatively connecting said driving member to said driven member; each of said intermediate members including means defining a second pair of spaced-apart parallel, flat bearing surfaces and means defining a third pair of spaced-apart parallel, flat bearing surfaces, each of said first pair of bearing surfaces being associated with a different one of said second pairs of bearing surfaces so that each bearing surface of a first pair is disposed in a mutually confronting parallel relation and opposite to a respective bearing surface of a second pair, and the third pair of bearing surfaces of one of said intermediate member being associated with the third pair of bearing surfaces of the other of said intermediate members so that each bearing surface of one third pair is disposed in a mutually confronting parallel relation and opposite to a respective bearing surface of the other third pair, the improvement comprising:

elastomeric bearing means for coupling (1) each of the bearing surfaces of the first pair of said driving member to a different bearing surface of the second pair of one of said intermediate members, (2) each of the bearing surfaces of the first pair of said driven member to a different bearing surface of the second pair of the other of said intermediate members, and (3) each of the bearing surfaces of a third pair of one of said intermediate members to a different bearing surface of the third pair of the other of said intermediate member;

wherein said bearing means comprises a plurality of elastomeric bearing units each comprising a plurality of alternate layers of resilient and nonextensible materials bonded one to another and disposed between and engaging corresponding oppositely disposed ones of said bearing surfaces, all of said being units have substantially equal torsional spring rates and substantially equal angular spring rates, and all of said bearing units are compressed in response to a torque load applied to said driving member about said first axis and move in shear in response to axial misalignment or axial displacement of said driving or driven members about said respective first and second axes.

2. A coupling according to claim 1, wherein said coupling is adapted to function as a constant velocity coupling.

3. A coupling according to claim 1, wherein said first axis and second axis are oriented at a predetermined operating angle and said intermediate members are mounted to pivot about a predetermined axis when torque is applied to said driving member about said first axis, and wherein said first and second axes intersect said predetermined axis and each other at substantially the same point.

4. A coupling according to claim 3, wherein the torsional spring rates of said units are substantially equal, and the angular spring rates of said units are substantially equal so that said coupling is capable of functioning as a constant velocity coupling.

* * * * *